(12) United States Patent
Jones et al.

(10) Patent No.: US 7,853,605 B2
(45) Date of Patent: Dec. 14, 2010

(54) AUXILIARY DATA PROVIDER

(75) Inventors: Jeffrey D. Jones, Redmond, WA (US); Jeffrey P. Snover, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 11/192,536

(22) Filed: Jul. 29, 2005

(65) Prior Publication Data

US 2007/0044042 A1 Feb. 22, 2007

(51) Int. Cl.
*G06F 7/00* (2006.01)
(52) U.S. Cl. ..................... 707/763
(58) Field of Classification Search ............ 707/1, 707/763
See application file for complete search history.

(56) References Cited

U.S. PATENT DOCUMENTS

2005/0091576 A1* 4/2005 Relyea et al. ............... 715/502
2005/0091672 A1* 4/2005 Debique et al. ............. 719/328

\* cited by examiner

*Primary Examiner*—Etienne P LeRoux
*Assistant Examiner*—Ajith Jacob
(74) *Attorney, Agent, or Firm*—Lee & Hayes, PLLC

(57) ABSTRACT

An exemplary software architecture allows for defining and accessing data and auxiliary data for an item in a navigable namespace. For example, such an exemplary architecture can include a provider engine operable to access data for an item in a navigable namespace, an auxiliary provider engine operable to access auxiliary data for the item and an auxiliary provider class for use in defining the auxiliary data for the item and accessing the auxiliary data for the item. Various other exemplary technologies are also disclosed.

14 Claims, 8 Drawing Sheets

Exemplary Method 500

AUXILIARY DATA PROVIDER

BACKGROUND

In traditional command environments users can navigate through a hierarchical storage system and view data and attributes that the system associates with each path. These environments lack an ability to dynamically extend the data for an item at a given path based on the path, data, and properties defined for that item where the extended data is at a different location (e.g., a different path). Various exemplary technologies disclosed herein aim to address this issue as well as other issues.

SUMMARY

Various exemplary technologies discussed herein pertain to auxiliary data providers and, in particular, to techniques to define auxiliary data providers and to acquire information from such providers. For example, an exemplary framework allows pluggable resource-related components to define dynamic data for an item in a navigable namespace. In such an example, navigation may occur via a command line shell, an application, an embedded device, an API(s), a GUI(s), etc. In this particular example, navigation can occur because the item exists in association with an auxiliary data provider that is defined through use of one or more pluggable components. Further, access to such an item can occur through use of one or more exemplary commands directed to an auxiliary provider (e.g., via auxiliary provider services). Various other exemplary technologies are also disclosed.

BRIEF DESCRIPTION OF THE DRAWINGS

Non-limiting and non-exhaustive examples are described with reference to the following figures, wherein like reference numerals generally refer to like parts throughout the various views.

DETAILED DESCRIPTION

Figure 1:
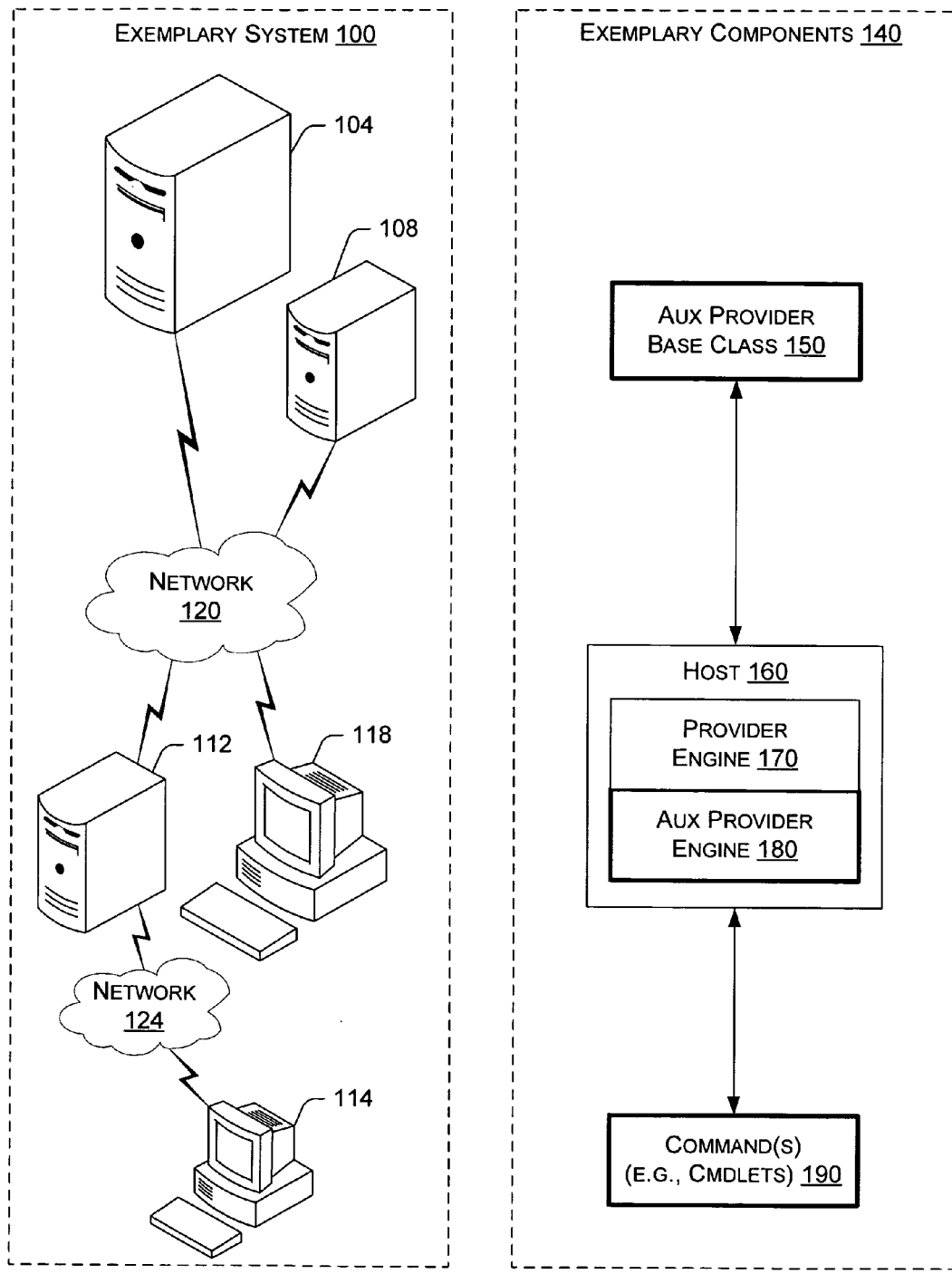
FIG. 1 is a diagram of an exemplary system and exemplary components for use with such a system.

As already mentioned, various exemplary technologies discussed herein pertain to auxiliary data providers and, in particular, to techniques to define auxiliary data providers and to acquire information from such providers. An exemplary framework allows pluggable resource-related components to define dynamic data for an item in a navigable namespace where navigation may occur via a command line shell. While a command line shell or environment is mentioned, an application, a GUI, an API, an embedded device, etc., may be used for defining, identifying, navigating or acquiring information from an auxiliary data provider.

An exemplary framework may be structured according to an architecture. An exemplary software architecture provides for defining and accessing data for an item in a navigable namespace. Such an exemplary architecture can include a provider engine operable to access data for an item in a navigable namespace, an auxiliary provider engine operable to access auxiliary data for the item in a navigable namespace and an auxiliary provider class for use in defining the auxiliary data for the item and accessing the auxiliary data for the item. In various examples, entry of commands for defining, accessing, etc., such auxiliary data occurs via a command line shell. In such examples or other examples, an application, a GUI, an API, an embedded device, etc., may be used for defining, identifying, navigating or acquiring information from an auxiliary data provider. In various examples, a pluggable architecture allows for at least pluggable auxiliary data providers.

As mentioned in the Background section, traditional command environments allow users to navigate through a hierarchical storage system and view data and attributes that the system associates with each path. Various exemplary technologies described herein provide an ability to dynamically extend the data for an item at a given path based on the path, data or properties defined for that item with data from a different location (referred to herein as an auxiliary data provider or simply an auxiliary provider). While a different location is mentioned, a different location may be a different location of the same data store, a different location of a different data store, etc. In various examples, auxiliary data may be computed information, etc. In such an example, computation may occur upon a request for such information (e.g., a request for auxiliary data). In various examples, a different location refers to a path that differs from the path of the item. In various examples, a path for auxiliary data may be referred to as an auxiliary path while a path for an item may be referred to as a primary path.

Various exemplary components allow for creation of an auxiliary provider and retrieval of information therefrom, for example, based on a primary provider path (e.g., an Active Directory provider path). An exemplary framework allows a user to navigate to a primary provider (e.g., a primary provider user) in a command line shell and to get information about such an auxiliary provider using one or more commands (e.g., cmdlets); various exemplary commands further cause the auxiliary provider to retrieve requested information.

As discussed further below, various exemplary technologies can be implemented in conjunction with a particular pluggable data-store model known as the WINDOWS® shell (Microsoft Corporation, Redmond, Wash.), which is sometimes referred to as MSH. The MSH model can use commands referred to as "cmdlets" and data resources that respond to such cmdlets are known as "Cmdlet Providers". Various exemplary technologies disclosed herein can create "Cmdlet Auxiliary Providers", which fall generally under the term "auxiliary provider". Such exemplary auxiliary providers can be added to a system to dynamically extend data for an item. In various examples, access to such auxiliary provider data can occur by simply specifying a provider path (e.g., a Cmdlet Provider path).

Consider an example where a Cmdlet Provider exists for Active Directory (named AD). In the MSH model, this provider allows the user to navigate through Active Directory and look at the items or objects that are stored in AD. A user can view and modify properties of the AD objects, and can move, remove, and create new AD items. Consider a path in the AD data store for a user account. Consider that additional data related to this user (e.g., an employee) exists in another data store, "HR database" (e.g., on the same machine as the AD data store or on a different machine); however, HR database is not exposed through the Cmdlet Provider. Various exemplary technologies disclosed herein allow for transforming the HR database into an auxiliary provider (e.g., a "Cmdlet Auxiliary Provider") that can be exposed in response to a user inputting the AD path (e.g., path of an AD object) and optionally one or more commands (e.g., cmdlets). Once exposed, navigation to a particular portion of the HR database may occur or simply retrieval of information from the HR database may occur where the portion of the HR database or the information therein pertain to the AD object. Navigation may occur via a command line shell, a GUI, one or more APIs, etc. Further, a user may retrieve HR database information using a cmdlet that relies on various exemplary auxiliary provider components.

Such technologies may be implemented through use of various components in a computing environment such as a system of computers connected by one or more networks. In some instances, where appropriate, an exemplary framework may be loaded on a single computer where the computer has one or more data stores. FIG. 1 shows an exemplary system 100 and associated exemplary components 140. The system 100 includes one or more servers 104, 108, 112, one or more clients 114, 118 and one or more networks 120, 124 for communication between various servers and clients. The network 120 may be the Internet while the network 124 may be an intranet where the server 112 operates as a local server (e.g., local data server, firewall server, etc.).

The associated exemplary components 140 facilitate access to information. As discussed herein, such information is available through providers, which include primary providers and auxiliary providers. Whether primary or auxiliary, providers are or act as information resources, such as, databases, that generally associate information with a namespace or namespaces. An "auxiliary" provider can provide auxiliary information relevant to that of a primary provider. Any of the servers 104, 108 and 112 or the client 118 may be a primary or an auxiliary provider (e.g., possibly a primary and an auxiliary provider).

The exemplary components 140 facilitate access to information or identification of information via various exemplary auxiliary provider-related features. As shown in FIG. 1, exemplary components 140 include an auxiliary provider base class 150, a host framework 160, a provider engine 170, an auxiliary provider engine 180 and a command component 190 that provides a mechanism for command input (e.g., script input or "cmdlet" input). Such a command component may by a GUI, set of GUIs, rely on one or more APIs, etc. For example, a GUI button may be programmed to issue a command, a path and a command, etc.

The auxiliary provider base class 150 allows for creation of an auxiliary provider. For example, a developer may use the component 150 to enable a server to operate as an auxiliary provider. Once defined, a computer having the host framework 160 may access the auxiliary provider using the auxiliary provider engine 180. The host framework 160 also includes a provider engine 170 to thereby allow a host computer to access primary providers and auxiliary providers. While the provider engine 170 and the auxiliary provider engine 180 are shown as separate components, a single engine of the host framework 160 may operate to perform such provider and auxiliary provider functions.

The command component 190 allows a user to input commands that cause the host framework 160 to identify or access information from a provider and one or more auxiliary providers. Commands may be script or "cmdlet" commands or optionally other types of commands. The command component 190 may include a specific set of commands directed to various exemplary auxiliary provider services or features.

With respect to the term "cmdlet", a cmdlet is a command that can utilize common functions provided by the host framework 160, such as parsing, data validation, error reporting, and the like. Because such common functions can be implemented once and tested once, the use of cmdlets allows the incremental development and test costs associated with application-specific functions to be quite low compared to traditional environments.

Figure 6:
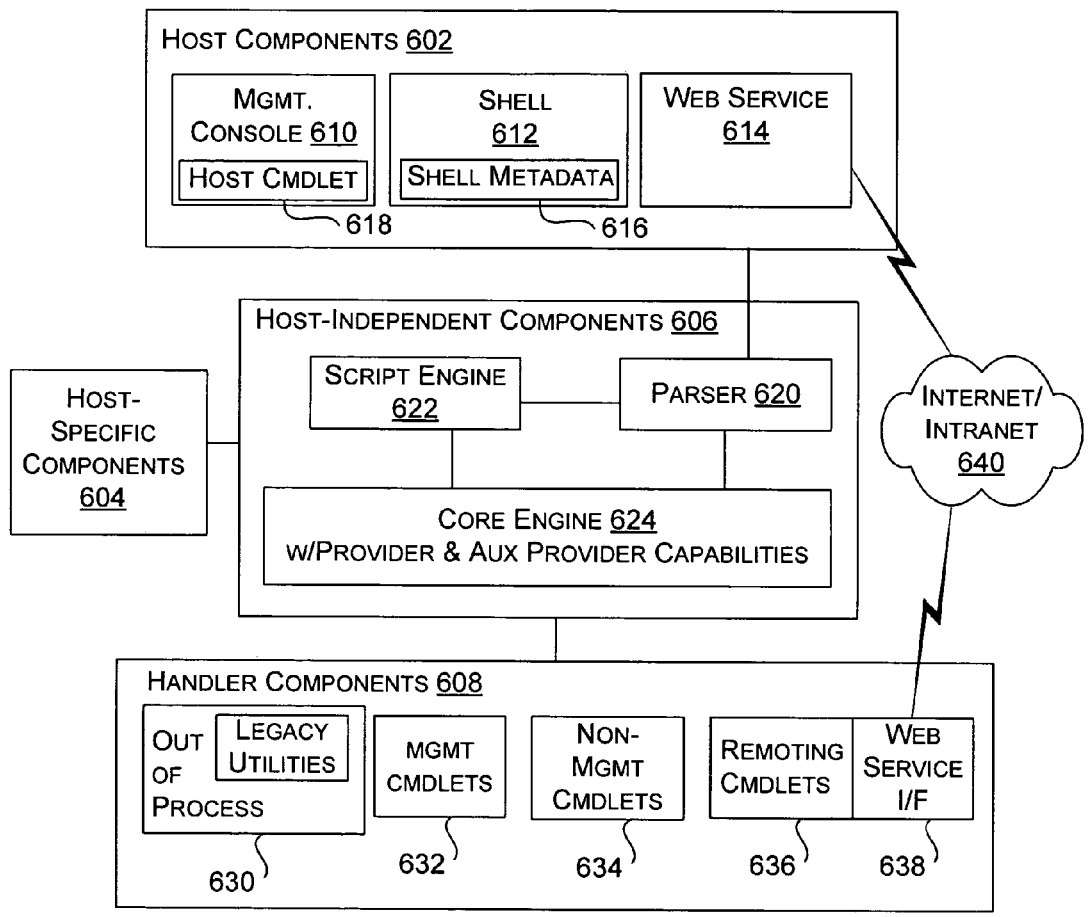
FIG. 6 is a diagram of an exemplary host framework having auxiliary provider capabilities.

In addition, in contrast to traditional environments, cmdlets do not need to be stand-alone executable programs. Rather, cmdlets may run in the same processes within an administrative tool framework. This allows cmdlets to exchange "live" objects between each other. This ability to exchange "live" objects allows the cmdlets to directly invoke methods on these objects. Various details for creating and using cmdlets are described in further detail below. In particular, FIG. 6 shows an exemplary host framework 600 that can operate via cmdlet commands. This exemplary host framework corresponds generally to a command shell such as the MICROSOFT® shell or "MSH" (Microsoft Corp., Redmond, Wash.).

The MICROSOFT® shell aims to facilitate administration of information resources via a command line (e.g., a command line environment). Commands entered via a command line allow a user to navigate through objects (e.g., information), as associated with namespaces of providers. Results responsive to such commands can be shown in any of a variety of manner, for example, plain text, HTML, XML, etc.

To implement such an administrative framework, one or more providers are created where information is in the form of objects and objects are assigned one or more namespaces. The administrative framework then allows for navigation of such information, typically in a tree-like fashion. For example, an Active Directory setup may be navigated using a command line.

As described herein, various exemplary components allow for creating a provider and one or more auxiliary providers. Such components are optionally implemented in conjunction with a shell (e.g., the MSH) whereby, via entry of one or more commands (e.g., cmdlets), various exemplary components allow for identification or access to information as a virtual drive in the command shell.

Referring again to FIG. 1, a user at the client terminal or computer 114 may enter a command in a command shell of a host framework of the server 112 whereby the command includes a namespace (e.g., a path including a namespace). Given a provider (e.g., the server 104) having that namespace and an auxiliary provider (e.g., the server 108), as defined by the base class 150, the auxiliary provider engine 180 may access the auxiliary provider using the namespace. Accordingly, information related to the namespace that exists with the auxiliary provider may be readily identified or accessed by commands entered by the user at the command shell level.

While the foregoing example includes the host 160 (and provider engine 170 and auxiliary provider 180) on computer 112, a provider on computer 104 and an auxiliary provider on computer 108, various arrangements are possible. For example, a host, provider and auxiliary provider may be implemented on a single computer or, as mentioned, on more than one computer. Further, use of an exemplary system does not necessarily require user input via a client computer.

An exemplary infrastructure or architecture built using the exemplary components 140 allows for "pluggable" providers, surface navigation and operations for a namespace or data set. In particular, the exemplary components provide a means of allowing developers that did not create a primary or "original" provider to expose extra data for that provider, for example, in the form of an auxiliary provider. As discussed herein, an association is established between a primary provider and an auxiliary provider via specification of a primary provider path and one or more commands that can call for auxiliary provider services.

Figure 2:
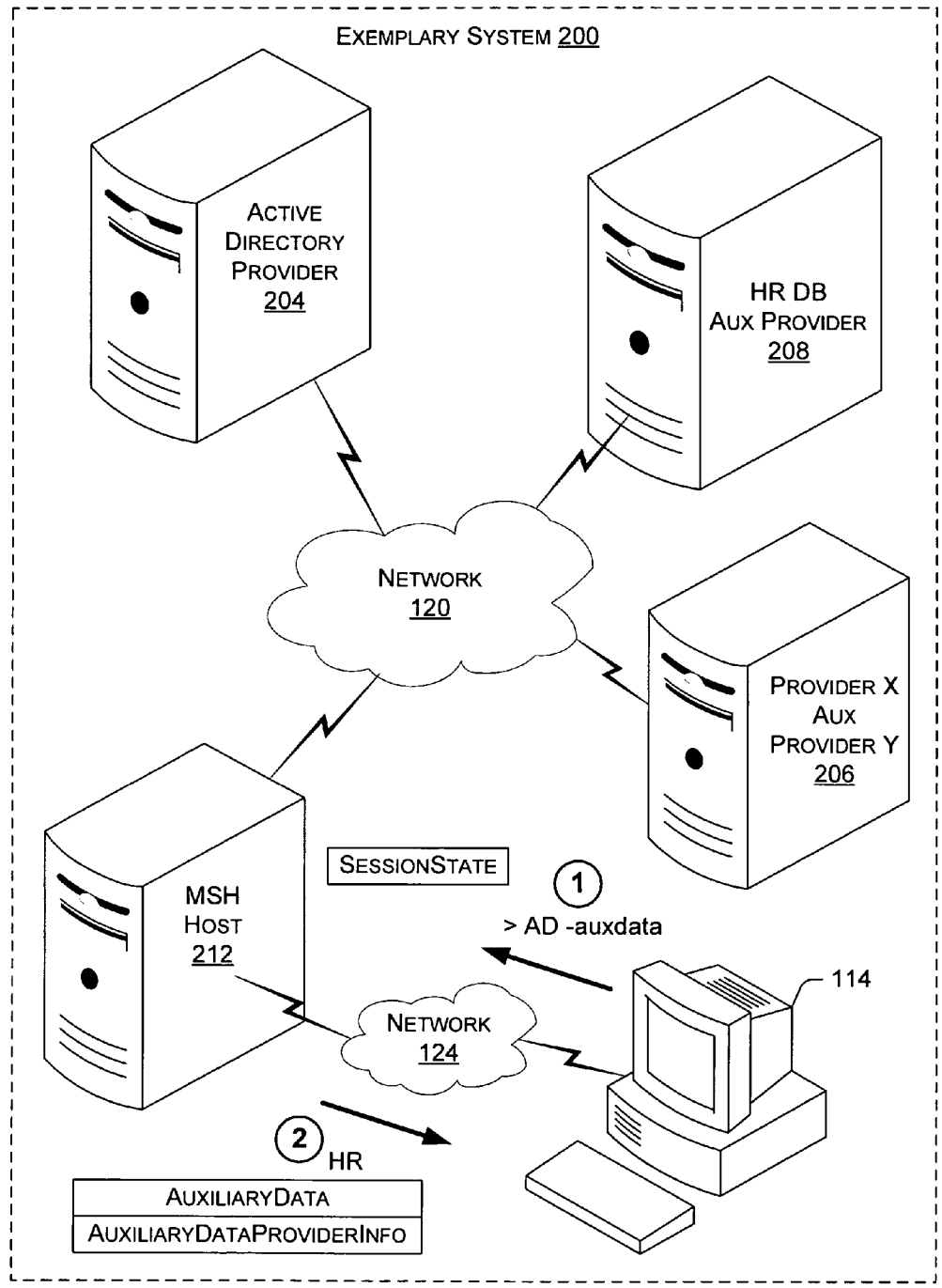
FIG. 2 is a diagram of an exemplary system and an exemplary process for exposing one or more auxiliary providers using a path and a command.

FIG. 2 shows a specific example implemented in an exemplary system 200 that includes an Active Director (AD) provider 204, a HR database auxiliary provider 208, a MSH host 212 and a client terminal or computer 114 where one or more networks (e.g., the networks 120, 124) allow for communication between the various machines. Another computer 206 includes another provider X and another auxiliary provider Y, which may be an auxiliary provider of provider X or another data store. As already mentioned, a host, provider and auxiliary provider may be implemented on a single computer having one or more data stores.

In various examples, the host and provider engines (e.g., provider engine and auxiliary provider engine) reside on the same machine. A provider may access data for one or more other machines. A primary provider and an auxiliary provider may access data for a local machine, each on its own remote machine, each on the same remote machine, etc.

FIG. 2 also shows an exemplary process with steps (1) and (2). In this example, a user at the terminal 114 establishes a session with the MSH host 212 and enters a line command at a prompt>"AD-auxdata" (step (1)). The MSH host 212 receives the command and operates on the command using an exemplary host framework with auxiliary provider capabilities. In response to the command, the MSH host 212 notifies the client 114 that an auxiliary provider exists as associated with "AD" (i.e., Active Director provider 204) (step (2)). In this example, "HR" is returned, indicating the auxiliary provider 208. Such associations may be stored using an auxiliary data structure (e.g., AuxiliaryData) that includes auxiliary provider information (e.g., AuxiliaryDataProviderInfo).

Figure 3:
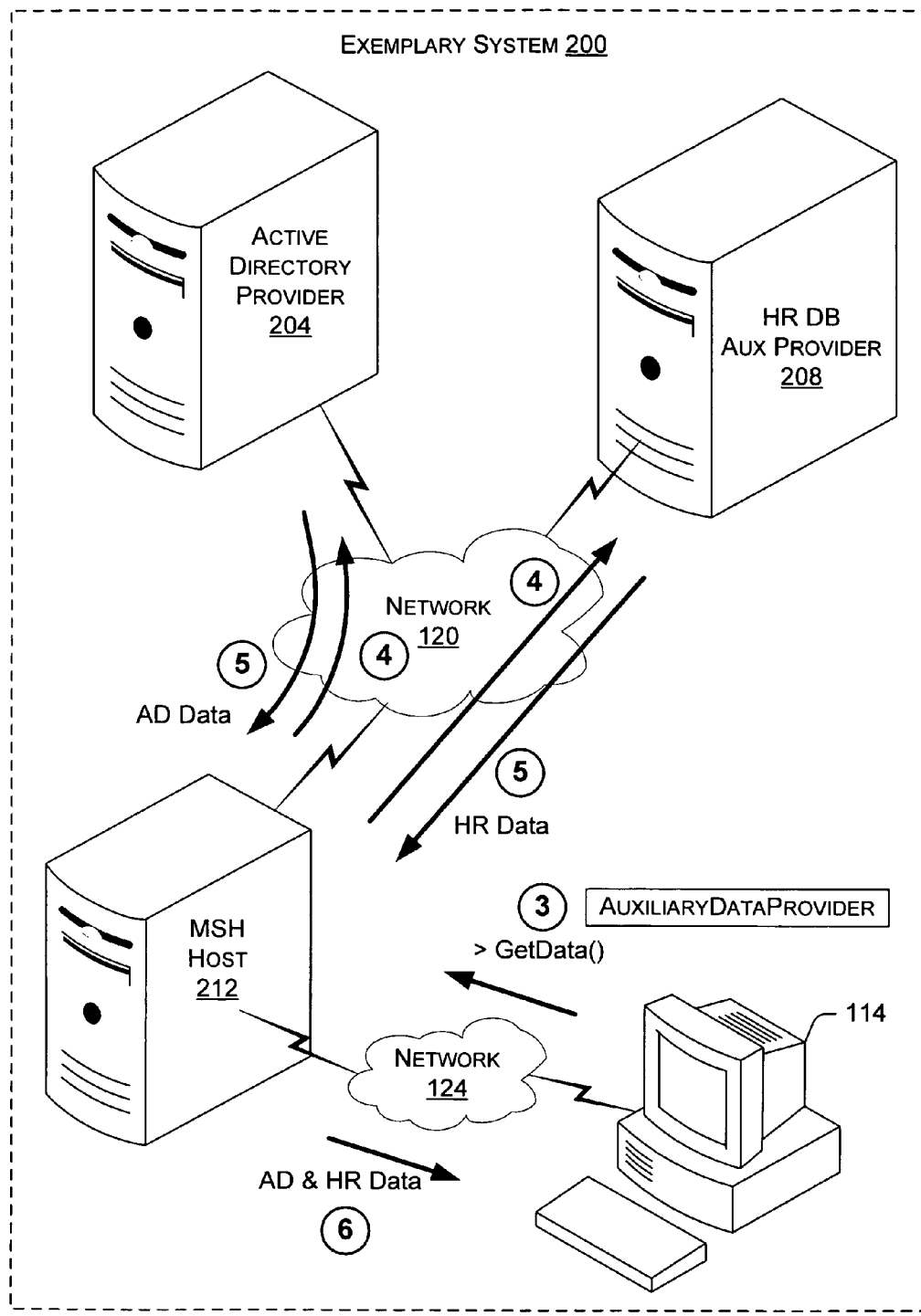
FIG. 3 is a diagram of the exemplary system of FIG. 2 and an exemplary process for retrieving data from an auxiliary provider using a command.

The example of FIG. 2 continues in FIG. 3, again, with reference to the exemplary system 200 (with provider X/aux provider Y 206 omitted). Once the user at the client 114 knows that an auxiliary provider exists (i.e., HR provider 208), then the user may enter a command (e.g., an auxiliary provider services command, AuxiliaryDataProvider) to access the information. In the example of FIG. 3, the user enters the line command at a prompt>"GetData( )" (step (3)). The MSH host 212 receives this command and, using an exemplary host framework with auxiliary provider capabilities, calls for data from the auxiliary provider 208 and optionally the Active Directory provider 204 (step (4)). For example, one "get" command may call for information from a primary provider (e.g., the AD provider 204) and one or more auxiliary providers (e.g., the HR auxiliary provider 208, etc.). The called for information may be routed via the MSH host 212 (step (5)) or another route to the client 114 (step (6)) or other destination, as appropriate.

While various examples refer to entering a path or a command in a command line environment (e.g., via a command line shell), a path or a command may be entered via alternative manners. For example, a GUI may provide various entry fields or buttons that allow a user to select a path or to select a command for issuance. Yet other manners include use of an application, one or more APIs, an embedded device, etc. A combination of manners may be available as well. Entry may occur in an interactive manner or a programmed manner (e.g., timed, batch, event driven, etc.).

Figure 4:
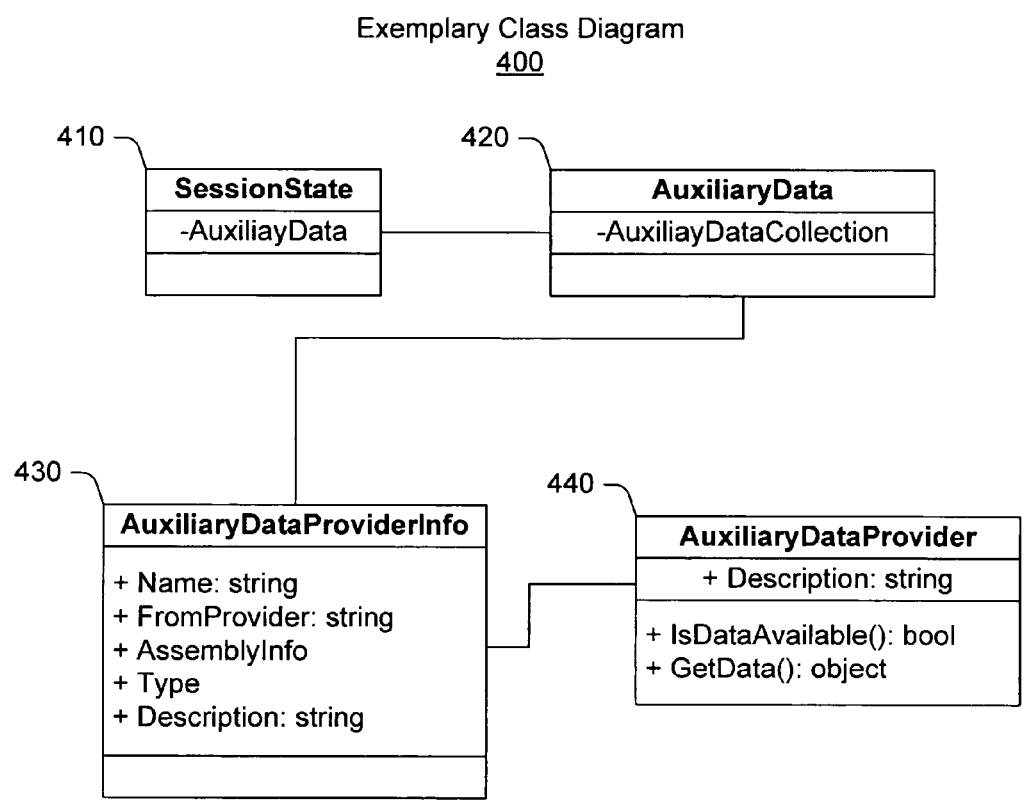
FIG. 4 is an exemplary class diagram for an auxiliary provider.

FIG. 2 shows a "SessionState" object and an "AuxiliaryData" object while FIG. 3 shows an "AuxiliaryDataProvider" object. FIG. 4 shows an exemplary class diagram 400 as to how such objects can be organized or structured.

Per the diagram 400, the SessionState object 410 acts to add those members which are related to auxiliary data providers. The AuxiliaryData member (-AuxiliaryData) of the SessionState object 410 is a reference to an AuxiliaryData object 420 which contains the storage and functionality for auxiliary data providers. For example, the exemplary AuxiliaryData object 420 can contain the storage and APIs to manipulate the registration and access the functionality of auxiliary data providers. The object can contain a hashtable of auxiliary provider information (see AuxiliaryDataProviderInfo class 430) which may be keyed by combining the name with the FromProvider.

The exemplary AuxiliaryDataProviderInfo class 430 contains the registration information that may be required by an auxiliary data provider to thereby allow an auxiliary provider engine to determine, for example, which auxiliary data providers are available in each provider space (e.g., FromProvider), what the names of those providers are (Name), and what code implements the auxiliary data provider (AssemblyInfo and Type). In this example, the description is a localized string that gives the user more information about the provider.

The exemplary AuxiliaryDataProvider class is a base class that an implementation of an auxiliary data provider derives from. For example, refer to the auxiliary provider base class component 150 of FIG. 1. Such a class provides the implementation of various methods, for example, a method for telling an auxiliary provider engine (see, e.g., the engine 180 of FIG. 1) if the auxiliary data is available for a certain path (IsDataAvailable), a method for retrieving the data (GetData), etc.

Referring again to the exemplary components 140 of FIG. 1, three main components are included: the base class 150 that a developer would derive from to create an auxiliary data provider; the auxiliary provider engine 180 which routes calls to the appropriate auxiliary data provider; and the command(s) 190 (e.g., cmdlet(s)) that expose the functionality of the auxiliary provider to an end user.

In an exemplary implementation, an AuxiliaryDataProvider (e.g., an auxiliary provider) is defined by the derivation from an AuxiliaryDataProvider base class (see, e.g., the class 440 of FIG. 4) that is decorated with an AuxiliaryDataProviderAttribute. In this exemplary implementation, the AuxiliaryDataProviderAttribute is placed on the class that derives from the AuxiliaryDataProvider base class. The attribute contains the Name, and the FromProvider. The Name gets exposed to the end user to identify what auxiliary data is available from a provider path (sometimes referred to as a CmdletProvider path where a cmdlet is involved). The FromProvider states the CmdletProvider (e.g., the primary or original provider) from which the auxiliary provider can interpret the path to retrieve the data.

In this exemplary implementation, the AuxiliaryDataProvider base class is an abstract class with two methods (IsDataAvailable, and GetData), and an abstract property (Description). These methods are for use by an auxiliary engine (e.g., the auxiliary provider engine 180 of FIG. 1) to expose the data to an end user in response to cmdlets.

In this exemplary implementation, to expose auxiliary data or information form an auxiliary provider, a class must derive from AuxiliaryDataProvider and override the following methods. It must also declare one or more AuxiliaryDataProviderAttribute(s) on the class which contain the name of the auxiliary data provider, and the "from provider". Consider the following example:

```
[AuxiliaryDataProvider("HRdatabase", "ActiveDirectory")]
Public class EmployeeInformationDataProvider : AuxiliaryDataProvider
{
    ...
}
```

In such an example, an IsDataAvailable method of the AuxiliaryDataProvider class can tell the appropriate engine whether the auxiliary data that this AuxiliaryDataProvider represents is valid for the given path. As indicated in the example of FIG. 4, the method may return a Boolean value (e.g., true if data is available, and false if it is not). The exemplary GetData method returns to the appropriate engine the auxiliary data for a given path if it is available. The description of the AuxiliaryDataProvider class is a localized string that describes the auxiliary data that the AuxiliaryDataProvider provides.

The exemplary components 140 include the auxiliary provider engine 180, which in an exemplary implementation is referred to as an Auxiliary Data Engine. A host framework (e.g., the host framework 160) may include such an engine to provide data structures and functionality to load, manipulate, and surface the auxiliary providers through APIs which can be consumed by commands (e.g., CmdletProviders and cmdlets).

A definition can be specified for an auxiliary provider that allows for cooperation and recognition. For example, an auxiliary data provider can be defined as a name, and a "from provider" (e.g., a primary or original provider). In such an example, given a CmdletProvider path, the associated Auxiliary Data Engine knows which CmdletProvider the path came from and it can potentially expose auxiliary data for any AuxiliaryDataProvider that has this CmdletProvider as the "FromProvider" in its declaration.

Loading of auxiliary providers can occur through an identification process that uses various discovery APIs that may rely on, for example, a file that includes information related to auxiliary data providers (e.g., addresses, namespaces, etc.). Various other techniques for loading of auxiliary providers may be used. An exemplary process includes registration of an auxiliary data provider in a registry (e.g., a WINDOWS® OS registry, etc.), for example, upon installation. Also, consider that a runtime may load an appropriate auxiliary provider when the runtime is started. Another exemplary technique may include compiling an auxiliary provider into a host application with a strong reference.

Delay-load relationships are possible. For example, if a CmdletProvider that is declared as the FromProvider is not loaded at the time the auxiliary data provider gets loaded, the auxiliary data provider is put in a delay-load table. According to such a delay-load relationship, auxiliary data providers in the delay-load table are not exposed to the user when "get-auxdata" is called. The delay-load data providers are only seen through a special command (e.g., "get-auxdata-all"). Removal may occur using a command such as "remove-auxdata".

For an exemplary delay-load relationship, when a CmdletProvider gets added to a system, the one or more delay-load data providers are processed. In this example, any delay-load data providers that are now valid due to the addition of their missing FromProvider can be added to the normal data providers table and become valid auxiliary data providers that are visible to the user.

When a CmdletProvider gets removed from a system, the auxiliary data providers in the normal data providers table can be processed and any that are no longer valid can be moved to a delay-load data providers table.

Various exemplary features allow for manipulation of loaded Auxiliary Data Providers. For example, APIs for adding, getting, and removing the auxiliary data providers can be exposed to cmdlets, cmdletproviders, relationshipproviders, and auxiliarydataproviders through an AuxiliaryDataProviderIntrinics façade.

Various exemplary intrinsics allow for interaction with auxiliary providers. For example, an exemplary class AuxiliaryDataProviderIntrinsics includes:

GetAll—property returns all the loaded AuxiliaryDataProviderInfo that are in the AuxDataCollection. An overload that takes the relationship name will return all AuxiliaryDataProviderInfo objects for relationships of a given name. Exceptions: No exception will be thrown if no results are found.

Get—returns the AuxiliaryDataProviderInfo for the specified auxiliary data provder name and "from provider". Exceptions: ArgumentException if name is null or empty; ProviderNotFoundException if no AuxiliaryDataProvider is found with that name; and ProviderInvocationException if the provider exists but threw an exception. An InnerException is an exception thrown by the provider.

New—adds a new entry in the AuxDataCollection for the AuxiliaryDataProvider declared by the auxiliarydataprovider file at the specified path. Exceptions: ArgumentException if path is null or empty; FileNotFoundException if a auxiliarydataprovider file could not be found at that path; and ProviderException if a auxiliary data provider with the given name and "from provider" already exists.

Remove—removes the entry in the AuxDataCollection for the specified auxiliary data provider name. Exceptions: ArgumentException if either name or fromProvider is null or empty; and ProviderNotFoundException if a AuxiliaryDataProvider does not exist with that name and fromProvider.

GetData—calls the appropriate AuxiliaryDataProvider to retrieve the auxiliary data for the specified path. Exceptions: ArgumentException if name is empty or null; ProviderNotFoundException if the specified auxiliary data provider does not exist; and ProviderInvocationException if the AuxiliaryDataProvider throws an exception. The InnerException the exception that was thrown by the AuxiliaryDataProvider.

An exemplary AuxiliaryDataProviderInfo class includes:

Name—gets the name of the auxiliary data provider as a string. Note, more than one auxiliary data provider can have the same name, so data providers can be distinguished by both name and "from provider". Exceptions: None.

FromProvider—gets the CmdletProvider name for which the auxiliary data provider can retrieve extra data. This is a string with no exceptions.

AssemblyInfo—gets the assembly information for the assembly that implements the auxiliary data provider. Exceptions: None.

Type—gets the type that implements the auxiliary data provider. Exceptions: If the assembly and/or type have not been loaded any of the following exceptions may occur: FileNotFoundException; FileLoadException; BadImageFormatException; and SecurityException.

Description—gets or sets the description of the auxiliary data provider. Exceptions: None.

Various exemplary APIs may include:

System.Management.Automation.Provider.Auxiliary DataProvider is a new base class containing abstract methods that one must override to create a pluggable auxiliary data provider.

System.Management.Automation.AuxiliaryDataProvider ManagementIntrinsics is a set of APIs for creating, removing, and getting information about the auxiliary data providers in the Windows Command Shell.

System.Management.Automation.RelationshipProvider Intrinsics is a set of APIs for accessing the functionality of the relationship providers.

Get-relationship, new-relationship, remove-relationship, resolve-relationship, get-childitem-relationship, set-location-relationship, are push-location-relationship the cmdlets that expose the functionality to the end user and the MSH scripting language.

Figure 5:
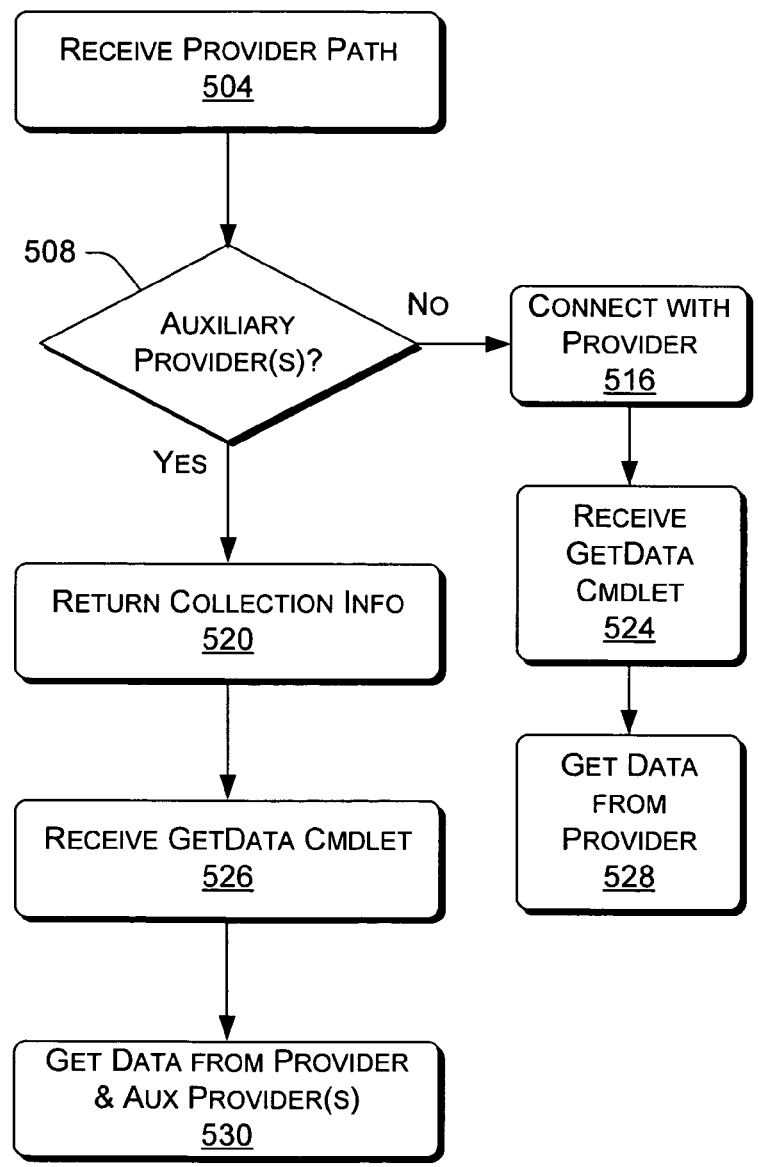
FIG. 5 is diagram of an exemplary method for retrieving information from a provider or an auxiliary provider.

FIG. 5 shows an exemplary method for retrieving data 500. The method 500 commences in a reception block 504 where a host framework receives a provider path. A decision block 508 follows that decides if any auxiliary providers are specified for the provider path. If no auxiliary providers are specified, then the method 500 continues in a connection block 516 that establish a connection with the provider or otherwise communicates with the provider associated with the provider path. Again, the provider may be a data store on the same computer as the host and, hence, the connection pertains to connection to the data store or component that connects to the data store. Notification of the connection may be transmitted to a user (e.g., a client computer or terminal). Next, a reception block 524 receives a GetData cmdlet. In response to this cmdlet, a get data block 528 of the host framework (e.g., a provider engine of the host framework) retrieves data from the provider per the provider path received in the reception block 504.

In the case that the decision block 508 decides that one or more auxiliary providers are available or specified, then the method 500 continues in a return collection information block 520 that acts to return relevant information to a user (e.g., a client computer, terminal, etc.). As in the other branch, a reception block 526 receives a GetData cmdlet. This particular cmdlet may be processed by a provider engine (e.g., the provider engine 170), an auxiliary provider engine (e.g., the auxiliary provider engine 180) or a general engine that includes auxiliary provider service capabilities. In response to this cmdlet, a get data block 530 of the host framework (e.g., the host framework 160) retrieves data from the provider and from one or more auxiliary providers, as appropriate, per the provider path received in the reception block 504. Again, the provider, the auxiliary provider or the provider and auxiliary provider may be one or more data stores of the same computer as the host and, hence, the connection pertains to connection to the data store or component that connects to the data store. Also, the provider and auxiliary provider may be one or more data stores of the same computer.

The exemplary method 500 may operate via commands entered via a line command prompt associated with a command level shell. In such a manner, information stored in various resources may be identified and accessed without an a priori knowledge of location. In essence, a user need only issue a single command that specifies a single known path or namespace and, in response, the exemplary method can identify all relevant resources.

Exemplary Host Framework

FIG. 6 is a block diagram generally illustrating an overview of an exemplary host framework 600. In this example, the host framework 600 includes one or more host components 602, host-specific components 604, host-independent components 606, and handler components 608. The host-independent components 606 may communicate with each of the other components (i.e., the host components 602, the host-specific components 604, and the handler components 608). Various components are briefly described below.

Host Components

The host components 602 include one or more host programs (e.g., host programs 610-614) that expose automation features for an associated application to users or to other programs. Each host program 610, 612, 614 may expose these automation features in its own particular style, such as via a command line, a graphical user interface (GUI), a voice recognition interface, application programming interface (API), a scripting language, a web service, and the like.

In this example, cmdlets can be used to surface various capabilities to a user of the associated host program 610, 612, 614. Again, the term "cmdlet" refers to commands that are used with various exemplary provider services (e.g., primary providers, auxiliary providers, etc.).

In overview, each host program 610, 612, 614 manages various interactions between the user and the other components within the host framework 600. These interactions may include prompts for parameters, reports of errors, and the like. Typically, each host program 610, 612, 614 may provide its own set of specific host cmdlets (e.g., host cmdlets 618). For example, if the host program is an email program, the host program may provide host cmdlets that interact with mailboxes and messages.

While FIG. 6 illustrates host programs 610, 612, 614, one skilled in the art will appreciate that host components 602 may include other host programs associated with existing or newly created applications.

In the exemplary host framework 600, the host program 610 may be a management console that provides a simple, consistent, administration user interface for users to create, save, and open administrative tools that manage the hardware, software, and network components of the computing device. To accomplish these functions, the host program 610 provides a set of services for building management GUIs. The GUI interactions may also be exposed as user-visible scripts that help teach the users the scripting capabilities provided by the administrative tool environment.

In another example, the host program may be a command line interactive shell (i.e., host program 612). The command line interactive shell may allow shell metadata 616 to be input on the command line to affect processing of the command line.

In still another example, the host program may be a web service (i.e., host program 614) that uses industry standard specifications for distributed computing and interoperability across platforms, programming languages, and applications. In addition to these examples, third parties may add their own host components by creating "third party" or "provider" interfaces and provider cmdlets that are used with their host program or other host programs.

A provider interface (e.g., for a primary provider, auxiliary provider, etc.) exposes an application or infrastructure so that the application or infrastructure can be manipulated by the exemplary host framework 600. The provider cmdlets provide automation for navigation, diagnostics, configuration, lifecycle, operations, and the like. The provider cmdlets can exhibit polymorphic cmdlet behavior on a completely heterogeneous set of data stores.

The exemplary host framework 600 generally operates on the provider cmdlets (e.g., primary provider, auxiliary provider, etc.) with the same priority as other cmdlet classes. A provider cmdlet can be created using the same mechanisms as the other cmdlets. A provider cmdlets can expose specific functionality of an application or an infrastructure to the host framework 600. Thus, through the use of cmdlets, product developers need only create one host component that will then allow their product to operate with many administrative tools. For example, system level graphical user interface help menus may be integrated and ported to existing applications.

Host-Specific Components

The host-specific components 604 include a collection of services that computing systems can use to isolate the host framework 600 from the specifics of the platform on which the framework is running. Thus, a set of host-specific components can exist for each type of platform. The host-specific components allow the users to use the same administrative tools on different operating systems.

Host-specific components 604 may include an intellisense/metadata access component, a help cmdlet component, a configuration/registration component, a cmdlet setup component, and an output interface component. Such components can communicate with a database store manager associated with a database store.

Host-Independent Components

The host-independent components 606 include a parser 620 and a script engine 622 that can communicate with various other components (e.g., an intellisense/metadata access component and other components). A core engine 624, having provider and auxiliary provider capabilities, can communicate, for example, with a help cmdlet component, a configuration/registration component, a cmdlet setup component, and an output interface component. Such an output interface component can include interfaces provided by a host to out cmdlets. These out cmdlets can then call the host's output object to perform the rendering. Host-specific components 604 may also include a logging/auditing component, which the core engine 624 can use to communicate with host specific (i.e., platform specific) services that provide logging and auditing capabilities. An exemplary parser, script engine and core engine are discussed in more detail further below.

Handler Components

The exemplary host framework 600 can include various handler components 608, for example, legacy utilities 630, management cmdlets 632, non-management cmdlets 634, remoting cmdlets 636, and a web service interface 638. The management cmdlets 632 (also referred to as platform cmdlets) include cmdlets that query or manipulate the configuration information associated with the computing device. Because management cmdlets 632 manipulate system type information, they are dependant upon a particular platform. However, each platform typically has management cmdlets 632 that provide similar actions as management cmdlets 632 on other platforms.

In the exemplary host framework 600, the host-independent components 606 communicate with the management cmdlets via cmdlet objects generated within the host-independent components 606.

The non-management cmdlets 634 (sometimes referred to as base cmdlets) include cmdlets that group, sort, filter, and perform other processing on objects provided by the management cmdlets 632. The non-management cmdlets 634 may also include cmdlets for formatting and outputting data associated with the pipelined objects. The non-management cmdlets 634 may be the same on each platform and provide a set of utilities that interact with host-independent components 606 via cmdlet objects. The interactions between the non-management cmdlets 634 and the host-independent components 606 allow reflection on objects and allow processing on the reflected objects independent of their (object) type. Thus, these utilities allow developers to write non-management cmdlets once and then apply these non-management cmdlets across all classes of objects supported on a computing system.

The legacy utilities 630 include existing executables, such as win32 executables that run under cmd.exe. Each legacy utility 630 communicates with the administrative tool framework using text streams (i.e., stdin and stdout), which are a type of object within the object framework. The legacy utilities 630 typically execute in a different process than the host framework 600; although not shown, other cmdlets may also operate out of process.

The remoting cmdlets 636, in combination with the web service interface 638, provide remoting mechanisms to access interactive and programmatic administrative tool environments on other computing devices over a communication media, such as internet or intranet (e.g., internet/intranet 640 shown in FIG. 6). A remoting mechanism can allow scripts to execute on remote computing devices. The scripts may be run on a single or on multiple remote systems. The results of the scripts may be processed as each individual script completes or the results may be aggregated and processed en-masse after all the scripts on the various computing devices have completed.

Consider a remoting example where web service 614 shown as one of the host components 602 may be a remote agent. The remote agent handles the submission of remote command requests to the parser on the target system. The remoting cmdlets serve as the remote client to provide access to the remote agent. The remote agent and the remoting cmdlets communicate via a parsed stream. This parsed stream may be protected at the protocol layer, or additional cmdlets may be used to encrypt and then decrypt the parsed stream.

Host-Independent Components

As already mentioned, the host-independent components 606 include a parser 620, a script engine 622 and a core engine 624 with provider and auxiliary provider capabilities. The host-independent components 606 provide mechanisms and services to group multiple cmdlets, coordinate the operation of the cmdlets, and coordinate the interaction of other resources, sessions, and jobs with the cmdlets. In this example, the core engine 624 includes provider and auxiliary provider capabilities (see, e.g., the host framework 160 and engines 170 and 180 of FIG. 1).

Exemplary Parser 620

The parser 620 provides mechanisms for receiving input requests from various host programs and mapping the input requests to uniform cmdlet, such as within the core engine 624. In addition, the parser 620 may perform data processing based on the input received. The parser 620 may provide the capability to easily expose different languages or syntax to users for the same capabilities. System administrators may provide different parsers on different computing devices that support different syntax. However, in general, each user operating with the same parser will experience a consistent syntax for each cmdlet. In contrast, in traditional environments, each command implemented its own syntax. Thus, with thousands of commands, each environment supported several different syntax, usually many of which were inconsistent with each other.

Exemplary Script Engine 622

The script engine 622 provides mechanisms and services to tie multiple cmdlets together using a script. In the exemplary host framework 600, a script is an aggregation of command lines that share session state under strict rules of inheritance. The multiple command lines within the script may be executed either synchronously or asynchronously, based on the syntax provided in the input request. The script engine 622 has the ability to process control structures, such as loops and conditional clauses and to process variables within the script. The script engine also manages session state and gives cmdlets access to session data based on a policy.

Exemplary Core Engine 624

The core engine 624 is responsible for processing cmdlets identified by the parser 620. The exemplary core engine 624 may include a pipeline processor, a loader, a metadata processor, an error & event handler, a session manager, and an extended type manager. Such a metadata processor can be configured to access and store metadata within a metadata store, such as a database store. The metadata may be supplied via the command line, within a cmdlet class definition, and the like. Different components within the host framework 600 may request the metadata when performing their processing. For example, the parser 602 may request metadata to validate parameters supplied on the command line.

An error & event processor may provide an error object to store information about each occurrence of an error during processing of a command line. A session manager may supply session and state information to other components within the host framework 600. The state information managed by the session manager may be accessed by any cmdlet, host, or core engine via programming interfaces. These programming interfaces allow for the creation, modification, and deletion of state information.

A loader may be configured to load each cmdlet in memory in order for a pipeline processor to execute the cmdlet. Such a pipeline processor can include a cmdlet processor and a cmdlet manager where the cmdlet processor dispatches individual cmdlets. If the cmdlet requires execution on a remote, or a set of remote machines, the cmdlet processor can coordinate the execution with, for example, the remoting cmdlet. A cmdlet manager can handle the execution of aggregations of cmdlets. A cmdlet manager, a cmdlet processor, and a script engine (e.g., the script engine 622 of FIG. 6) can communicate with each other in order to perform the processing on the input received from a host program (e.g., the programs 610-614). Such communication may be recursive in nature. For example, if the host program provides a script, the script may invoke the cmdlet manager to execute a cmdlet, which itself may be a script. The script may then be executed by the script engine.

Exemplary Extended Type Manager

As mentioned above, the exemplary host framework 600 provides a set of utilities that allows reflection on objects and allows processing on the reflected objects independent of their (object) type. Reflection typically provides the ability to query an object and to obtain a type for the object, and then reflect on various objects and properties associated with that type of object to obtain other objects and/or a desired value.

Even though reflection may provide a considerable amount of information on objects, reflection may focus on the type of object. For example, when a database datatable is reflected upon, the information that is returned can be that the datatable has two properties: a column property and a row property. These two properties do not provide sufficient detail regarding the "objects" within the datatable. Thus, an extended type manager may be used that focuses on the usage of the type. For this extended type manager, the type of object is not important. Instead, the extended type manager is interested in whether the object can be used to obtain required information. Continuing with the above datatable example, knowing that the datatable has a column property and a row property is not particularly interesting, but appreciated that one column contained information of interest. Focusing on the usage, one could associate each row with an "object" and associate each column with a "property" of that "object". Thus, an extended type manager provides a mechanism to create "objects" from any type of precisely parse-able input. In so doing, such an extended type manager supplements the reflection capabilities and extends "reflection" to any type of precisely parse-able input.

In overview, the extended type manager may be configured to access precisely parse-able input and to correlate the precisely parse-able input with a requested data type. Such an extended type manager can then provide the requested information to the requesting component, such as a pipeline processor or parser (e.g., the parser 620). Parse-able input refers generally to input in which properties and values may be discerned. Some exemplary precisely parse-able input include Windows Management Instrumentation (WMI) input, ActiveX Data Objects (ADO) input, eXtensible Markup Language (XML) input, and object input, such as .NET objects. Other precisely parse-able input may include third party data formats.

Exemplary Process for Processing Commands

An exemplary process for processing commands such as cmdlets may use various host-independent components such as the parser 620, the script engine 622 and the core engine 624, which has provider and auxiliary provider capabilities. Such an exemplary process commences with either the parser 620 or the script engine 622 identifying a command string within an input. In general the core engine 624 performs set-up and sequencing of the data flow of the cmdlets.

Next, a cmdlet is identified, for example, thru registration. The core engine 624 determines whether the cmdlet is local or remote. The cmdlet may execute in the following locations: 1) within the application domain of the host framework 600; 2) within another application domain of the same process as the host framework 600; 3) within another process on the same computing device; or 4) within a remote computing device. The communication between cmdlets operating within the same process is through objects. The communication between cmdlets operating within different processes may be through a serialized structured data format.

After identification of a cmdlet, an instance of the cmdlet object is created and properties associated with the cmdlet object are populated. A developer can declare properties within a cmdlet class or within an external source. An exemplary host framework may decipher the incoming object(s) to the cmdlet instantiated from the cmdlet class based on the name and type that is declared for the property. If the types are different, the type may be coerced via the extended data type manager. Input parameters may alternatively or additionally be specified as coming from a command line.

Execution of the cmdlet can now occur. In overview, the processing provided by the cmdlet is performed at least once, which includes processing for each input object to the cmdlet. Thus, if the cmdlet is the first cmdlet within a pipelined command string, the processing is normally executed once. For subsequent cmdlets, the processing is executed for each object that is passed to the cmdlet. When the input parameters are only coming from the command line, execution of the cmdlet can use default methods provided by an associated base cmdlet case. Once the cmdlet is finished executing, the cmdlet is cleaned-up. This can include calling a destructor for the associated cmdlet object which is responsible for de-allocating memory and the like. The processing of the command string is then complete.

Figure 7:
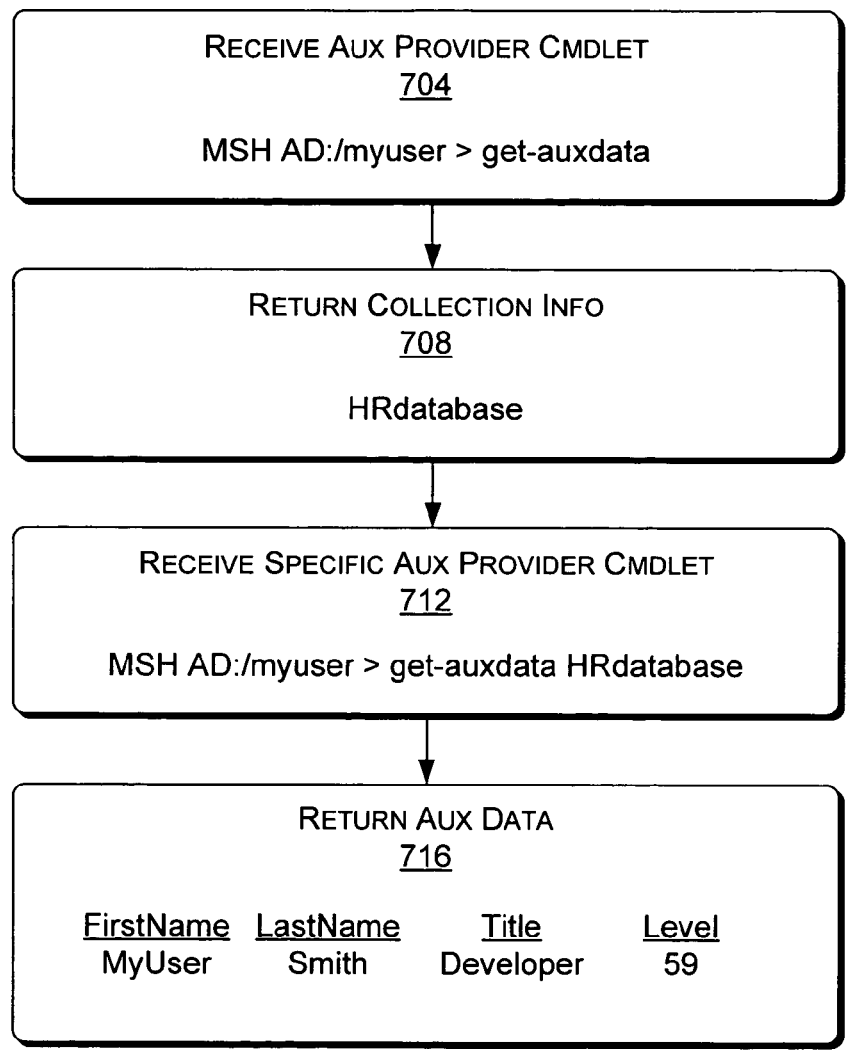
FIG. 7 is a diagram of an exemplary method for navigation and retrieval of information from an auxiliary provider.

FIG. 7 shows an exemplary method 700 that relies on the "MSH" shell (e.g., a command line environment) and includes an Active Directory ("AD") provider. The exemplary method 700 relies on various components of the exemplary host framework 600 of FIG. 6 and can operate in response to cmdlets entered via, for example, a line command prompt of the MSH shell. For example, a user may be at a client terminal with line command capabilities (e.g., consider the experience of and capabilities of the DEC VT100). As already mentioned, entry of a path or a command may occur via other manners (e.g., application, GUI, API, embedded device, etc.).

The exemplary method 700 commences in the MSH shell with a path "MSH AD:/myuser". A reception block 704 receives an auxiliary provider cmdlet "get-auxdata". In response to this cmdlet, a return block 708 of an exemplary host framework returns collection information for any associated auxiliary providers. In this example, the return block 708 returns "HRdatabase" (see, e.g., the HR database auxiliary provider 208 of FIGS. 2 and 3).

Once a user receives such information, the user may decide to access data from the HRdatabase auxiliary provider, if access is available. Accordingly, in a reception block 712, receives an auxiliary provider cmdlet "get-auxdata HRdatabase". In response to this cmdlet, a return block 716 of an exemplary host framework returns information from the specified auxiliary provider. In this example, the return block 716 returns various field information, including FirstName=MyUser (e.g., from the provider path), LastName=Smith, Title=Developer, and Level=59. In this example, only information from the auxiliary provider is returned. Other commands can allow for retrieval of a variety of information from primary providers (e.g., AD) and one or more auxiliary providers (e.g., HRdatabase).

Exemplary GUI Form Auxiliary Provider

In another example, an auxiliary data provider is a GUI form repository that stores GUI forms for use with display of an item stored in a primary data provider. In this example, a user specifies a path for the item in the primary data provider. An exemplary command (e.g., -auxform) is entered that exposes any auxiliary providers that may store a form for use in displaying information pertaining to the item. A subsequent command (e.g., getform) may be entered that retrieves the form and thereby allows for display of the item information using the form. In general, a GUI form available from an auxiliary provider may aid in navigation or presentation of information stored in one or more providers (e.g., primary providers, auxiliary providers, etc.).

Exemplary Computing Environment

Figure 8:
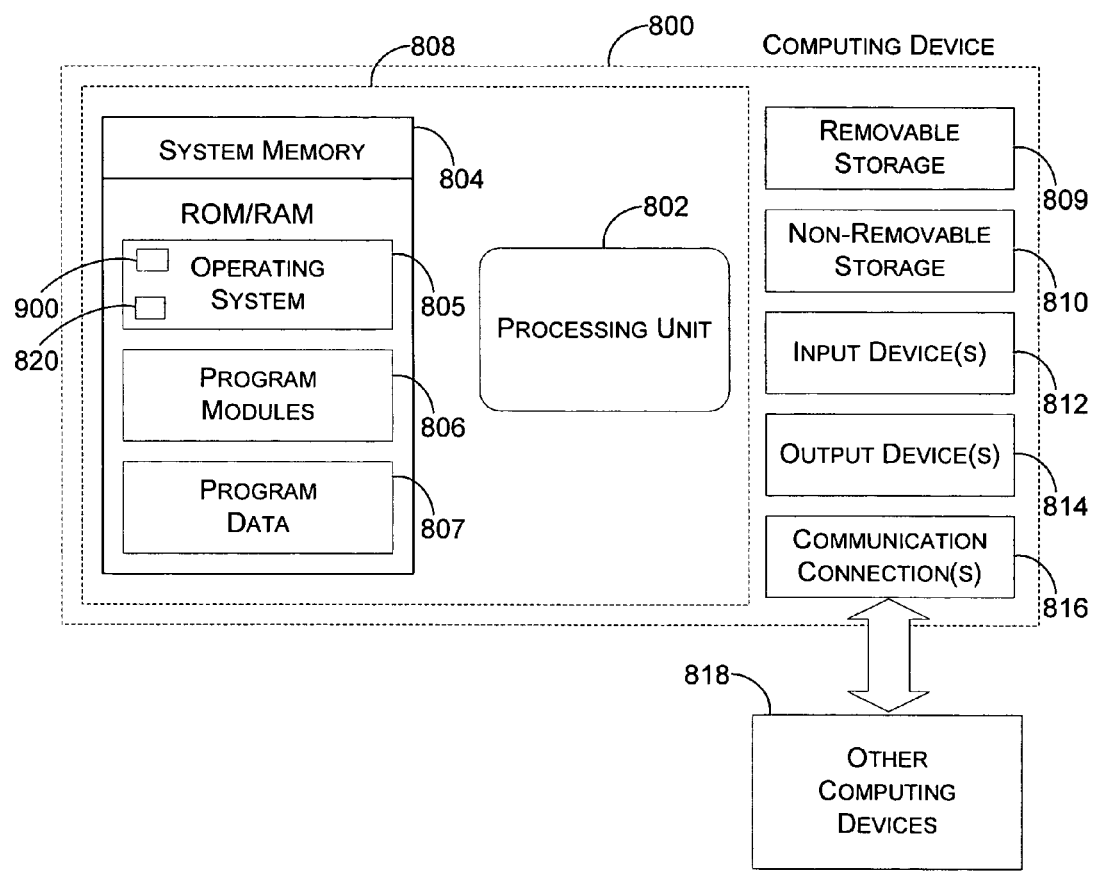
FIG. 8 is a diagram of an exemplary computing device that may be used in an exemplary system.

FIG. 8 illustrates an exemplary computing device 800 that may be used in an exemplary environment such as the exemplary system 100 of FIG. 1. For example, the servers and clients may include various features of the device 800. As already mentioned, commands may be entered using a terminal with command line capabilities; such a terminal may have fewer or lesser features than the device 800.

In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 805, one or more program modules 806, and may include program data 807. The operating system 806 include a component-based framework 820 that supports components (including properties and events), objects, inheritance, polymorphism, reflection, and provides an object-oriented component-based application programming interface (API), such as that of the .NET™ Framework manufactured by Microsoft Corporation, Redmond, Wash. The operating system 105 also includes an exemplary host framework 900, such as, but not limited to, the exemplary host framework 600 of FIG. 6. Other arrangements are possible. This very basic configuration is demarcated by a dashed line 808. Again, a terminal may have fewer components but will interact with a computing device that may have such a basic configuration.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well know in the art and need not be discussed at length here.

Computing device 800 may also contain communication connections 816 that allow the device to communicate with other computing devices 818, such as over a network (e.g., consider the networks 120, 124 of FIG. 1). Communication connections 816 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The invention claimed is:

1. A host computer comprising:
a processor coupled to computer storage media, the computer storage media containing processor-executable instructions adapted to be executed by the processor for hosting a software architecture responsive to receipt of a first path for an item in a navigable namespace for a file system, the software architecture comprising:
a provider engine operable to receive a request from a client computer via a network for accessing primary data established by a primary provider according to the first path for the item in the navigable namespace,
wherein the provider engine is operable to access a primary provider computer that stores the primary data for the item according to the first path of the primary data of the item for retrieving the primary data in response to the request;
an auxiliary provider engine operable to access auxiliary data for the item, wherein an auxiliary provider develops the auxiliary data related to the primary data, wherein an association is established between the primary provider and the auxiliary provider via specification of the first path of the primary data of the item and one or more commands that call for auxiliary provider services for providing the auxiliary data, wherein the auxiliary data is stored at a second path in the navigable namespace, different from the first path,
wherein the auxiliary provider engine accesses the auxiliary data on an auxiliary provider computer via the network according to the second path in the namespace, wherein the primary data and the auxiliary data exist on different data stores comprising a first data store managed by the primary provider computer for storing the primary data and a second data store managed by the auxiliary provider computer for storing the auxiliary data; and
an auxiliary provider class for establishing the association between the primary provider and the auxiliary provider and for associating the auxiliary data with the item, wherein the auxiliary provider class includes registration information for the auxiliary data provider computer for enabling the auxiliary provider engine to determine the auxiliary provider computer that contains the auxiliary data corresponding to the primary data of the item for accessing the auxiliary data for the item,
wherein the host computer is configured to expose the auxiliary provider to the client computer in response to receipt of the first path in the request for the item in the navigable namespace based on the association established between the primary data provider and the auxiliary data provider, wherein the host computer is configured to return both the primary data and the auxiliary data to the client computer in response to receiving a single get data command from the client computer.

2. The host computer of claim 1, the software architecture further comprising a pluggable architecture.

3. The host computer of claim 1 further comprising software for pluggable auxiliary providers that provide for auxiliary data.

4. The host computer of claim 1 wherein the auxiliary provider class is object-based.

5. The host computer of claim 4 wherein the auxiliary provider class comprises an object wherein the object comprises a hash table of information related to an auxiliary provider.

6. The host computer of claim 1 wherein the accessing the auxiliary data occurs in response to receipt of a path for the item in the navigable namespace and receipt of a command.

7. The host computer of claim 1 wherein the auxiliary data for the item exists in a navigable namespace.

8. The host computer of claim 1 wherein the accessing auxiliary data occurs in response to receipt of the path of the primary data for the item in the request from the client computer at the host computer.

9. Computer-readable storage media comprising processor executable instructions for implementing the auxiliary provider engine and the auxiliary provider class of claim 1.

10. A computer-implementable method implemented by one or more processors executing processor-executable instructions stored in computer storage media, the method comprising:
receiving, by a provider engine implemented by the one or more processors, a request from a client computer via a network for accessing primary data of an item, the request including a first path for the primary data of the item in a navigable namespace, wherein a primary data provider stores the primary data for the item, wherein the provider engine is operable to access a primary provider computer that stores the primary data for the item according to the first path of the primary data of the item for retrieving the primary data in response to the request;
based on the first path for the primary data of the item received in the request from the client computer, identifying, by an auxiliary provider engine one or more auxiliary data providers that store auxiliary data related to the primary data for the item developed by one or more auxiliary providers, wherein an association is established between the primary data provider and the one or more auxiliary data providers via specification of the first path of the primary data of the item and one or more commands that call for auxiliary provider services for providing the auxiliary data, wherein the auxiliary data is stored at one or more second paths in the navigable namespace, different from the first path, wherein the auxiliary provider engine accesses the auxiliary data on an auxiliary provider computer via the network according to the one or more second paths in the namespace, wherein the primary data and the auxiliary data exist on different data stores comprising a first data store managed by the primary provider computer for storing the primary data and a second data store managed by the auxiliary provider computer for storing the auxiliary data, wherein an auxiliary provider class establishes the association between the primary provider and the auxiliary provider for associating the auxiliary data with the item, wherein the auxiliary provider class includes registration information for the auxiliary data provider computer for enabling the auxiliary provider engine to determine the auxiliary provider computer that contains the auxiliary data corresponding to the primary data of the item for accessing the auxiliary data for the item;
exposing the one or more auxiliary data providers to the client computer in response to receipt of the first path in the request for the item in the navigable namespace, based on the association established between the primary data provider and the one or more auxiliary data providers;

receiving a single command to obtain data entered via a command line and, in response to the single command, accessing the auxiliary data from at least one of the one or more auxiliary data providers for retrieving the auxiliary data from the one or more auxiliary data providers; and providing both the primary data and the retrieved auxiliary data to the client computer in response to receiving the single command from the client computer.

11. The computer-implementable method of claim 10 further comprising loading an auxiliary data provider prior to the receiving the request, wherein the loading extends the primary data for the item through providing the auxiliary data, and wherein the auxiliary data is accessible given the first path for the item.

12. Computer-readable storage media comprising processor executable instructions adapted to be executed by one or more processors for performing a method, the method comprising:

receiving, via network, by a provider engine implemented by the one or more processors, a request for accessing primary data of an item from a client computer, the request including a first path in a navigable namespace to the primary data of the item on a primary provider computer, wherein the provider engine is operable to access the primary provider computer that stores the primary data for the item according to the first path of the primary data of the item for retrieving the primary data in response to the request;

identifying, by an auxiliary provider engine, one or more auxiliary data provider computers that store auxiliary data related to the primary data for the item in the navigable namespace, wherein the primary data is developed by a primary provider and the auxiliary data is developed for the item by an auxiliary provider, wherein an association is established between the primary provider and the auxiliary provider via specification of the first path of the primary data of the item and one or more commands that call for auxiliary provider services for providing the auxiliary data, wherein the auxiliary data is stored at a second path in the navigable namespace, different from the first path, wherein the auxiliary provider engine accesses the auxiliary data on the one or more auxiliary provider computers via the network according to the second path in the namespace, wherein the primary data and the auxiliary data exist on different data stores comprising a first data store managed by the primary provider computer for storing the primary data and a second data store managed by the one or more auxiliary provider computers for storing the auxiliary data, wherein an auxiliary provider class establishes the association between the primary provider and the auxiliary provider and for associating the auxiliary data with the item, wherein the auxiliary provider class includes registration information for the one or more auxiliary data provider computers for use in identifying the one or more auxiliary provider computers that contain the auxiliary data corresponding to the primary data of the item for accessing the auxiliary data for the item;

exposing the auxiliary provider to the client computer in response to receipt of the first path in the request for the item in the navigable namespace, based on the association established between the primary data provider and the auxiliary data provider;

responding to receipt of a single get data line command from the client computer by accessing the primary data from the primary provider computer and accessing auxiliary data from at least one of the one or more auxiliary data provider computers; and;

providing both the primary data and the auxiliary data to the client computer in response to receiving the single get data line command from the client computer.

13. The computer-readable storage media according to claim 12, wherein the instructions provide for one or more pluggable auxiliary data providers to provide the auxiliary data, wherein the pluggable auxiliary data providers are pluggable to the navigable namespace for identifying the one or more auxiliary data provider computers.

14. The computer-readable storage media according to claim 12, wherein the auxiliary provider class comprises an object, wherein the object comprises a hash table of information related to one or more auxiliary data providers.

* * * * *